Sept. 20, 1949.  L. L. BRANDT  2,482,648

FISH LURE

Filed July 23, 1945

INVENTOR.
LEWIS L. BRANDT.
BY
ATTORNEY

Patented Sept. 20, 1949

2,482,648

UNITED STATES PATENT OFFICE 2,482,648

FISH LURE

Lewis L. Brandt, Kansas City, Kans.

Application July 23, 1945, Serial No. 606,497

1 Claim. (Cl. 43—42.19)

This invention relates to artificial bait of the fish lure type and more particularly fishing tackle of the character having spinners thereon.

The primary aim of this invention is to provide a fish lure of the aforesaid character wherein is included, in combination with a spinner and hook carrying parts, a weight of special form and size disposed forwardly of the spinner supporting element.

Further aims of the invention are to provide a fish lure having an unique shank bent to provide a loop and hook whereby the fish hook per se may be removably held in place; having a specially disposed clevis for holding the spinner plate, and a weight through the medium whereof the entire lure may be submerged below the surface of the water during use.

Other aims of the invention include specific structural details contributing to the smooth and easy operation of all of the moving parts of the lure; said details being illustrated in the accompanying drawing, wherein.

It has heretofore been the practice to supply artificial bait of the type illustrated without weighting means other than the inherent sinking properties of the component parts of the lure. It is necessary under some conditions to add weight to the lure whereby the same is drawn along beneath the surface of the water while trolling, but unless the weight is attached in a proper place and formed to cut the water and avoid resistance, the entire purpose of the spinner is overcome and the fish lure is rendered useless. Accordingly, therefore, the lure contemplated by this invention embodies a very special type of weight positioned with particular regard to the spinner and contoured to accomplish desirable results.

Figure 1:
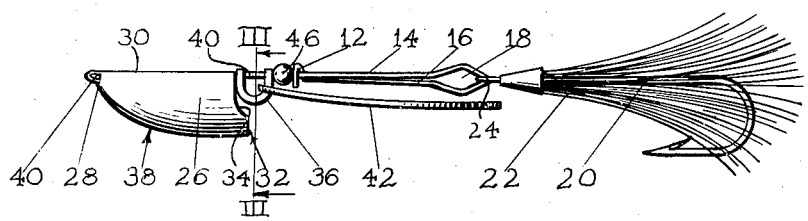
Fig. 1 is a side elevational view of a fish lure made in accordance with the present invention.
Figure 2:
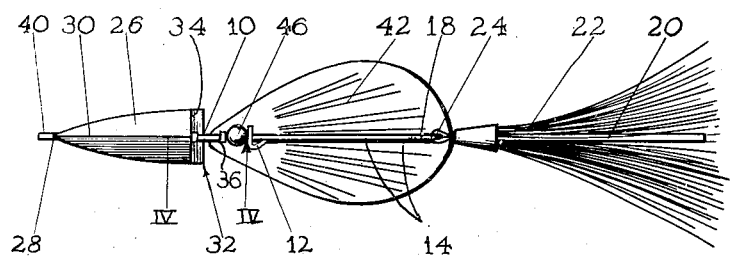
Fig. 2 is a top plan view of the fish lure.
Figure 5:
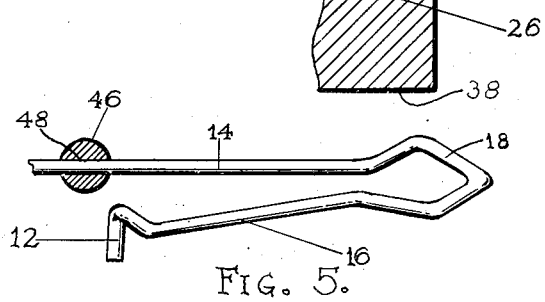
Fig. 5 is an enlarged fragmentary side elevational view of a portion of the shank illustrating the loop thereof in an open condition to receive the fish hook and the ball in section.

The form of the invention chosen for illustration includes a shank 10 constituting a long leg 14, and a short leg 16 having a hook 12 formed on the free end thereof. The wire material from which these members are formed has a resiliency capable of yieldably maintaining the hook 12 in engagement with the relatively long leg 14, as shown in Figs. 1 and 2. The short leg 16 is created by rebending the wire from which shank 10 is constructed back upon itself. At the zone of fold and juncture between short leg 16 and long leg 14 a loop 18 is created which should be substantially diamond shaped as shown in Figs. 1 and 5. It is within this loop that the conventional fish hook 20 having a fly 22 thereon, is mounted. The eye 24 of fish hook 20 is large enough to permit freedom of movement between hook 20 and loop 18 respectively.

When the fish hook 20 is to be removed, the hook 12 is disengaged from the relatively long leg 14 and the inherent resiliency of the material from which the parts of shank 10 are made will cause the legs 14 and 16 to assume the position shown in Fig. 5. Manifestly in such condition the hook 20 may be removed and a new one placed in its stead. The relatively long leg 14 of shank 10 extends forwardly a considerable distance from the hook 12 and it is upon this portion of the forwardly extending part of the long leg 14 that the weight 26 is mounted. This weight is of special form in that its normally forward end is mounted as at 28 and the top edge 30 thereof is straight and parallel with the axis of leg 14. The rear-most end 32 of weight 26 is offset as at 34 to accommodate a clevis 36, the character whereof will be more fully hereinafter set down.

The lower edge 38 of weight 26 is arched and flared outwardly and downwardly as the point 28 is left and as end 32 is approached. With the weight formed as just set forth and with the plane of loop 18 lying as shown in Fig. 1, the entire lure will be maintained in a position where success in fishing is most likely to occur. The fish hook 20 will not turn sidewise to a place where the fish is likely to strike and escape and so long as weight 26 remains in the normal condition the hook 20 will be most effective.

Figures 3, 4:
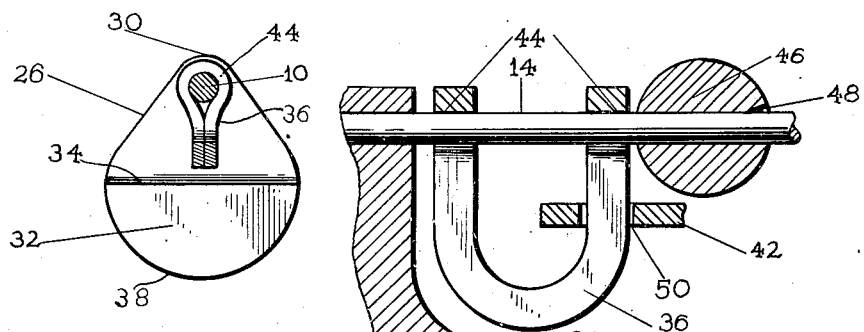
Fig. 3 is a vertical cross sectional view on an enlarged scale taken on line III—III of Fig. 1 and looking in the direction of the arrow.
Fig. 4 is an enlarged fragmentary detailed longitudinal sectional view taken on line IV—IV of Fig. 2.

The line extending to the fishing pole and reel is attached to loop 40 and the fish hook 20 will trail the entire assembly. A spinner plate 42 having the general form of those now conventionally known, is freely mounted for rotation about the axis of shank 10 by clevis 36. This clevis is detailed in Fig. 4 and comprises a U-shaped member having bearings 44 at the free ends of its legs to receive the long leg 14 of shank 10. The clevis 36 is immediately adjacent to the end of weight 26 and the outwardly offset portion of the weight underlies a small part of the clevis while one of the legs is contoured to bear against the curved innermost offset portion of the weight. Thus the clevis 36 is in such condition as to rotate without resistance of water due to the spreading action thereof as the weight 26 is drawn therethrough.

A ball 46 having a perforation 48 therethrough is threaded upon the leg 14 of shank 10 and practically fills the space between hook 12 and the proximal leg of the clevis 36. Thus the clevis is positioned between two smooth elements that reduce friction and the free rotation thereof is assured.

Spinner 42 has an opening 50 therethrough that is relatively large and full freedom of action will take place to establish the desired amount of water agitation and fish luring movement.

The manner of using the fish lure and advantages emanating therefrom will be obvious to those skilled in the art and while the preferred form of the invention has been illustrated and described, it is desired to be limited only by the spirit of the invention and scope of the appended claim.

Having thus described my invention, what I claim as new and desire to secure by Letters Patent is:

A fish lure of the type described comprising a shank rebent upon itself to provide a long and a short leg and an open loop at the zone of juncture between the said legs; a fish hook mounted in the said loop; a hook formed on the free end of the short leg to engage a long leg and maintain the loop closed and the legs in close side by side relation when the lure is assembled for use; a weight on the long leg between its free end and the said short leg; and a spinner assembly joined to the long leg, said long leg having a perforated ball threaded thereon between the hook on the free end of the short leg and the weight, said spinner assembly being rotatable about the axis of the long leg between the weight and the ball, said spinner assembly comprising a perforated spinner plate and a clevis rotatably mounted on the shank for free rotation about the axis thereof, said clevis passing loosely through the perforation of said spinner plate, said weight having one end thereof adjacent the clevis recessed to receive an adjacent part of the clevis, and said one end of the weight being spaced from the spinner plate when the latter is disposed perpendicular to the shank to permit free rotation of the spinner assembly about the axis of the shank.

LEWIS L. BRANDT.

REFERENCES CITED

The following references are of record in the file of this patent:

UNITED STATES PATENTS

| Number | Name | Date |
|---|---|---|
| 1,250,473 | Ladd | Dec. 18, 1917 |
| 1,566,812 | Bayer | Dec. 22, 1925 |
| 2,085,096 | Hansen | June 29, 1937 |
| 2,323,096 | McDowell | June 29, 1943 |
| 2,435,730 | Worden | Feb. 10, 1948 |

FOREIGN PATENTS

| Number | Country | Date |
|---|---|---|
| 848,036 | France | Oct. 18, 1939 |
| 853,859 | France | Mar. 30, 1940 |